United States Patent [19]

Grodski et al.

[11] Patent Number: 4,917,946
[45] Date of Patent: Apr. 17, 1990

[54] LOW MAGNETIC SIGNATURE PRODUCTS AND METHOD

[75] Inventors: Julius J. Grodski, Toronto; H. Laurie Miller, Oakville, both of Canada

[73] Assignee: Her Majesty the Queen as represented by the Minister of National Defence in Her Majesty's Canadian Governmenmt, Ottawa, Canada

[21] Appl. No.: 120,383

[22] Filed: Nov. 13, 1987

[30] Foreign Application Priority Data

Feb. 27, 1987 [CA] Canada ................................. 530863

[51] Int. Cl.$^4$ ........................... B32B 5/16; C08K 3/10
[52] U.S. Cl. ..................................... 428/328; 428/212; 428/403; 428/900; 523/200; 523/223; 523/442; 523/459; 523/513; 523/516; 524/439; 524/783
[58] Field of Search ............... 272/119; 428/403, 900, 428/212, 323, 328; 523/200, 223, 442, 459, 513, 516; 524/439, 779, 780, 783, 908; 2/21 R; 405/189

[56] References Cited

U.S. PATENT DOCUMENTS

| | | | |
|---|---|---|---|
| 4,218,057 | 8/1980 | Wilson | 279/119 |
| 4,250,136 | 2/1981 | Rex | 428/313.3 |
| 4,281,038 | 7/1981 | Ambros et al. | 428/407 |
| 4,602,784 | 7/1986 | Budden et al. | 272/119 |
| 4,621,808 | 11/1986 | Orchard et al. | 272/119 |

FOREIGN PATENT DOCUMENTS

| | | | |
|---|---|---|---|
| 3532512 | 3/1987 | Fed. Rep. of Germany | 272/119 |
| 83/01201 | 4/1983 | World Int. Prop. O. | 272/119 |

*Primary Examiner*—George F. Lesmes
*Assistant Examiner*—Christopher Brown
*Attorney, Agent, or Firm*—Nixon & Vanderhye

[57] ABSTRACT

The present invention comprises a solid composition having low magnetic signature. The composition comprises a plurality of high density, very low magnetic signature bodies or particles incorporated in a non-magnetic matrix of lesser density.

12 Claims, 1 Drawing Sheet

LOW MAGNETIC SIGNATURE PRODUCTS AND METHOD

BACKGROUND OF THE INVENTION

The present invention relates to a solid composition having low magnetic signature which may be formed into a variety of shapes and which may have a variety of uses.

In underwater diving, it is customary to use metal weights to control buoyancy of the diver and his equipment. Divers use cast lead weights or pouches containing lead spheres, generally known as lead shot, to compensate for positive buoyancy. Marker weights and shots are another example of negative buoyancy devices used as accessories in diving operations. Life-support equipment for underwater diving often includes air-filled cavities whose positive buoyancy may be compensated for using metal weights which are often designed to form an inherent part of the system. Generally, high density metals exhibit the desirable characteristics for positive buoyancy compensation applications. Lead is frequently used to satisfy these requirements because it provides the most cost-effective weight-to-volume ratio.

In underwater diving in search of mines it is essential to reduce the total magnetic signature of the diver and his life-support system and accessory equipment to environmental levels. In absence of any electronic equipment, the total magnetic signature of a diver and his equipment includes two major components. Any magnetic materials such as ferromagnetic iron which may be contained in the system contribute one component of the signature. Eddy currents generated within conducting parts of the system moving in the Earth's magnetic field are responsible for the second component of the magnetic signature.

To optimize such a system in this regard it must be designed and constructed paying attention to the contributing aspects. For example some diver's weights have been made of purified lead with ferromagnetic impurities content below thresholds detectable in standard compositions tests. However, diver's weights made of lead or any other metal or alloy and totally free of ferromagnetic impurities, will still exhibit a finite magnetic signature when moving in a magnetic field, including the Earth's magnetic field. Eddy currents generated in the electrically conducting material produce a magnetic field that acts to oppose such motion. The magnitude of the generated magnetic field depends on the magnitude of the eddy currents which in turn depend on a number of factors. Those which are controlled by a designer of low magnetic signature equipment include the conductivity of the material, its size, physical composition and shape. The user and the manufacturer of the equipment should know how to handle the system to maintain the low magnetic signature characteristics. For example, he should recognize that magnetic impurities may enter the system through contact and friction with ferromagnetic materials or adhesion of environmental ferromagnetic dust, including asbestos particles.

A diver's weight made of solid lead constitutes a large conducting body in which significant eddy currents may be generated. Pouches of lead-shot also exhibit similar problems because lead spheres in contact with one another become a large conducting body with properties similar to those of the solid metal.

THEORY AND OBJECTS OF THE INVENTION

Generally, eddy currents generated in a material will be reduced when a low conductivity material is used (e.g. lead instead of copper). The magnetic signature generated by eddy currents will also be reduced when the dimensions of the conducting body are minimized or preferably split into a multiplicity of small unconnected conducting bodies or particles. This confines the eddy currents to the small bodies or particles with a consequent increase in resistance which also impedes the currents and thereby lowers their amplitude. Additionally, such small unconnected particles are subjected to lesser gradients of the environmental magnetic field, further reducing magnitude of the generated eddy currents and thereby reducing the magnetic signature of the weight. The shape of the particles also plays a role. The orientation of the diver's weight containing the particles in relation to the direction of the Earth's magnetic field may be random and varying and therefore it is desirable to use spherically-shaped particles to yield eddy currents which exhibit a consistent directional behaviour.

It is an object of the present invention to provide magnetically clean independent or built-in buoyancy compensating devices in which the generation of eddy currents is minimized. It is a further object of the present invention to provide a product which is particularly suited for a divers' weighting device used to control buoyancy and which has low magnetic signature.

SUMMARY OF THE INVENTION

In accordance with the present invention there is provided a solid composition having a low magnetic signature. The composition comprises a plurality of non-magnetic bodies or particles of high density incorporated in a non-magnetic matrix of lesser density.

In a preferred embodiment of the present invention, the composition comprises a plurality of particles of lead shot incorporated within polymeric, vitreous or other non-metallic materials. The lead shot particles are selected to exhibit a magnetic signature below a predetermined acceptable value. Preferably the lead shot is Number two lead shot having a nominal diameter of 0.150 inches according to the American National Standard, Voluntary Industry Performance Standards for Pressure and Velocity of Shotshell Ammunition, Manufacturers Institute, Inc. ANSI/SAAMI Z299.2-1982. The particles are physically separated from each other by the polymeric or vitreous material. The separation of particles is readily accomplished during the coating or moulding process on account of the natural wetting of the particles' surfaces by the plastic. In situations requiring very high density packing of the particles (e.g. by a vibration method), it may be desirable to use particles which have been precoated with a polymeric or vitreous varnish or any other suitable coating to prevent occurrence of metal-to-metal contacts between the particles.

The manufacture of such compositions in accordance with the present invention may be carried out, for example, by pouring a plastic in liquid form into an open face mould to fill the mould to approximately one-quarter to one-third the volume of the mould, pouring lead shot, which is coated or uncoated with an appropriate polymeric or other non-metallic material and which has been degreased in a very slow trickle into the mould, allowing the shot to sink below the liquid surface before adding further quantities of shot, filling the mould with shot until a predetermined volume has been delivered, agitating the surface of the material to assist in uniform distribution of the shot, adding a final quantity of plastic to provide a smooth surface and allowing the mass to set.

Alternatively, such compositions may be manufactured using an injection moulding process. In this instance the method of making a solid composition having low magnetic signature comprises loading an injection mould which is capable of being heated and cooled with pre-heated, degreased, coated or uncoated lead shot until the mould is less than 90% full, closing the mould and injecting it with a thermoplastic, cooling the mould and composition within and removing the mass from the mould when it has hardened.

The present invention permits the manufacture of specifically shaped weights composed of agglomerations of metal particles such as lead shot which are physically and electrically separated, but nevertheless bonded together and encapsulated within rigid or flexible polymeric materials. The compositions in accordance with the present invention have very low or negligible magnetic signature characteristics, making them extremely well-suited for weighting devices to facilitate the operation of divers within special environments such as mine fields. The compositions and process methods enable the production of rigid or flexible weights which may be cut to length or the production of weights having unusual physical form such as weights in the form of a cylindrical coil springs or in the form of flexible rings which may be secured over the exterior of a cylindrical canister. As well, these compositions enable the production of weights which may become part of or be distributed throughout the body or wall of a component serving another, unrelated purpose.

BRIEF DESCRIPTION OF THE DRAWINGS

These and other objects and advantages of the invention will become apparent upon reading the following detailed description and upon referring to the drawings in which.

Figure 1:
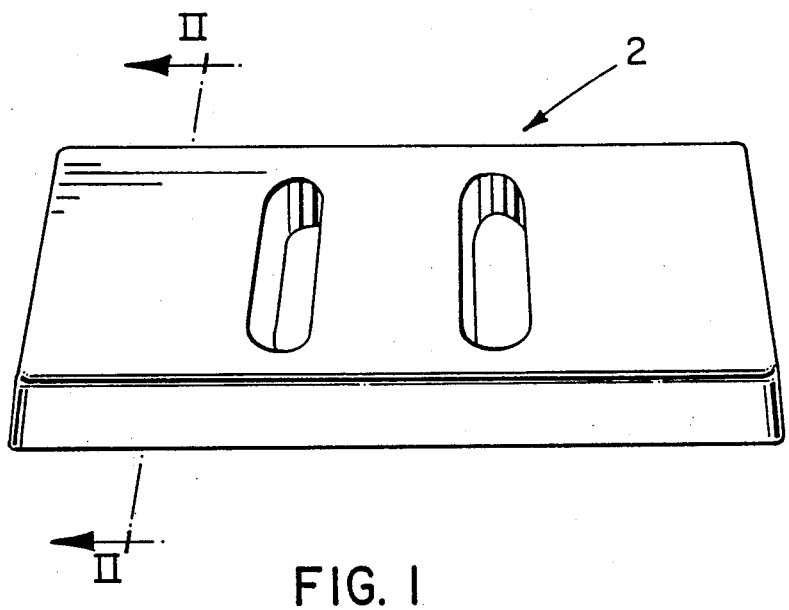
FIG. 1 is a perspective view of a composition in accordance with the present invention.
Figure 2:
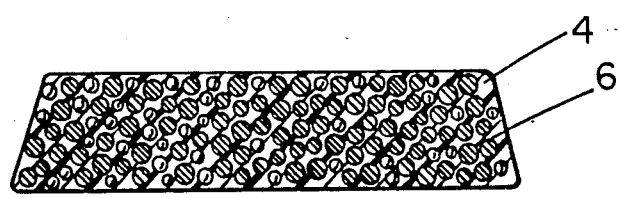
FIG. 2 is a section view along line II—II of FIG. 1.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

In FIG. 1 there is illustrated a typical divers' weighting device 2 for controlling the buoyancy of a diver in accordance with the present invention. Weight 2 is made up of a matrix of plastic 4, within which is encapsulated a plurality of spherical particles of lead shot 6. The particles of lead shot, in the illustrated device, are relatively evenly distributed throughout the weight. The weight 2, as can be seen, comprises a large number of individual shot particles 6 assembled together in close proximity without touching each other, to form a homogenous mass of definite configuration. The lead shot is selected through a process of rejecting units of lead shot exhibiting magnetic signature above a certain maximum predetermined acceptable value. As well, impurities such as grease are removed from the lead shot prior to being incorporated in plastic 4.

Any appropriate high density, non-magnetic metal may be used for the particles 6. These may include alloys. As well, shapes other than spherical may be used. However, spherical shapes are preferred since they minimize contacts between adjacent particles and thereby facilitate retention of the coating. Additionally, spherical particles exhibit more consistent eddy current characteristics. Use of two or more sizes of spherical or other shapes may also be appropriate if higher packing density is desired.

Examples of suitable polymers for these applications are thermosetting or thermoplastic resins which have an ability to suit the conditions under which the product will be used. Representatives of applicable thermosetting plastics are styrene polyester, epoxy resin, polyurethane, silicone rubber or any other suitable resin, including glass-reinforced polyester resin, which may be cured by the passage of time or elevated temperature. Representatives of applicable thermoplastic resins are polyethylenes, vinyl resins, polypropylene and nylon.

It will be appreciated that the composition according to the present invention facilitates the manufacture of components having a predetermined degree of buoyancy. This may be accomplished by varying the ratio of polymer to the mass of the high density particles. In accordance with this invention, products containing air cavities and preferably exhibiting neutral buoyancy may be more easily manufactured in a single process by incorporating an appropriate amount of lead shot or other appropriate high density non-magnetic material in the polymer during the forming process.

Products made of compositions in accordance with the present invention may be manufactured by a variety of methods. Some examples are discussed as follows.

Method 1

The apparatus used consists of a single element open face moulding or a casting tool. This mould may be manufactured from a plastic such as polyethylene or from other materials in which case a suitable mould release agent is applied to ensure that the casting will release from the mould. A quantity of a two component casting compound such as polyurethane is mixed in a container and poured into the horizontal moulding tool until it has filled approximately one-quarter of the volume of the mould. Number 2 lead shot which has been degreased (pre-coated, if desired) is then poured in a very slow trickle using a funnel or other suitable container into the mould allowing the shot to sink below the liquid surface before adding further quantities of shot. The filling with shot is continued until the pre-measured amount has been delivered. The surface of the material in the mould is then puddled with a stirrer to assist uniform distribution of the shot. A final quantity of the casting compound is now added to provide a smooth surface and the whole is then allowed to cure.

Method 2

A heat resistant mould made from metal is used for this manufacturing process. The well-known injection moudling process is used. A vertical machine is preferred since it facilitates loading the mould with shot. The mould which is capable of being heated and cooled is heated and loaded with pre-heated lead shot until it is less than 90% full. The lead shot may be coated, if desired. The mould is then closed and injected with a thermoplastic such as polyethylene and after the end of a cooling cycle the part is removed from the mould.

It will be appreciated that the composition and methods in accordance with the present invention enable production of rigid or flexible weights which can be customized according to shape or size by appropriate cutting. As well, the production of weights having unusual form such as cylindrical coil spring or flexible rings can be readily achieved in accordance with the present invention.

Thus it is apparent that there has been provided in accordance with the invention a solid composition having low magnetic signature that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privelege is claimed are defined as follows:

1. A solid composition having low magnetic signature for use in buoyancy compensating devices comprising a plurality of spherical unconnected particles of selected, degreased, low magnetic signature lead shot incorporated in a polymeric or other non-metallic matrix material, wherein the lead shot particles are physically and electrically separated from each other, being completely pre-coated with a suitable coating material.

2. A composition according to claim 1 wherein the particles are of at least two different sizes.

3. A composition according to claim 1, wherein the lead shot is Number two lead shot.

4. A composition according to claim 1 wherein the matrix is selected from the group consisting of thermosetting and thermoplastic resins.

5. A composition according to claim 1 wherein the matrix is a thermosetting resin selected from the group consisting of styrene polyester, epoxy resin, polyurethane, silicone rubber and glass-reinforced polyester resin.

6. A composition according to claim 1 wherein the matrix is of a thermoplastic resin selected from the group consisting of polyethylene, polypropylene, vinyl resins and nylon resins.

7. A composition according to claim 1, wherein the matrix is of flexible form.

8. A composition according to claim 1 in the form of a weight for underwater diving.

9. A composition according to claim 1 in the form of a device having neutral buoyancy.

10. A composition according to claim 1 in the form of a cylindrical coil spring.

11. A composition according to claim 1 wherein said solid composition comprises a diver's weighting device.

12. A composition according to claim 1, wherein the coating material is selected from a polymeric varnish and a vitreous varnish.

* * * * *